United States Patent [19]

Moyer, Jr. et al.

[11] 4,205,994

[45] Jun. 3, 1980

[54] EXPANSIVE CEMENT AND AGENT THEREFOR

[75] Inventors: Wendell W. Moyer, Jr., Atherton, Calif.; Robert Smith-Johannsen, Incline Village, Nev.

[73] Assignee: Raychem Corporation, Menlo Park, Calif.

[21] Appl. No.: 942,790

[22] Filed: Sep. 15, 1978

Related U.S. Application Data

[63] Continuation-in-part of Ser. No. 834,539, Sep. 19, 1977.

[51] Int. Cl.$^2$ .................................................. C04B 7/02
[52] U.S. Cl. ........................................ 106/97; 106/118; 106/306; 106/314; 106/315
[58] Field of Search ............... 106/89, 97, 118, 306, 106/314, 315; 423/432, 640

[56] References Cited

U.S. PATENT DOCUMENTS

| | | | |
|---|---|---|---|
| 721,871 | 3/1903 | Eldred | 106/118 |
| 1,732,409 | 10/1929 | Loomis et al. | 106/118 |
| 3,106,453 | 10/1963 | Corson | 423/640 |
| 3,649,317 | 3/1972 | Houseknecht | 106/314 |

OTHER PUBLICATIONS

Glasson, Reactivity of Lime and Related Oxides, IV, J. Appl. Chem., vol. 10, pp. 42–48, Jan., 1960.

*Primary Examiner*—James Poer
*Attorney, Agent, or Firm*—Lyon & Lyon

[57] ABSTRACT

Expansive cement compositions and novel expansion agents containing free lime for use in such compositions. The expansion agents are prepared by heating lime of particle size less than 250 microns in an atmosphere comprising water vapor at 100° to 400° C. or carbon dioxide at 350° to 850° C., or by heating a partially hydrated lime at a temperature of at least 100° C. The encapsulated limes produced in this way are useful as expansion agents in hydratable cement compositions, the amount thereof generally being less than 30%, preferably 3 to 10%, based on the weight of the cement and additive. Cement compositions containing the novel expansion agents are useful in a wide variety of uses where shrinkage of the composition on drying has to be prevented or reduced.

39 Claims, No Drawings

EXPANSIVE CEMENT AND AGENT THEREFOR

CROSS REFERENCE TO RELATED APPLICATION

This application is a continuation-in-part of our application Ser. No. 834,539 filed Sept. 19, 1977.

BACKGROUND OF THE INVENTION

1. Field of the Invention

This invention relates to expansive cement compositions.

2. Summary of the Prior Art

Compositions which contain hydratable cements (generally Portland cement) tend to shrink on drying. It is known to counteract this undesirable tendency by including in the composition an expansion additive which expands at the correct stage during the drying of the composition [see for example Gen. Civ. 109, 285 (1936, H. Lossier), U.C. SESM Report No. 72-13 (1973, G. Komendant et al.), Plan. Bau 2, 351 (1951, H. Bickenbach), Concrete Technology and Practice, 3rd Edn, 359 (1969, W. H. Taylor) and U.S. Pat. Nos. 3,519,449, 3,649,317, 3,801,339, 3,883,361, 3,884,710, 3,947,288 and 4,002,483]. In many of the known expansion additives, the active ingredient is free lime (CaO), also known as quick lime, which expands by about 100% in volume when hydrated, the other ingredients being present to prevent the hydration taking place until the desired stage in the drying of the cement composition. Free lime is one of the ingredients of Portland cement, but an excess of it is normally regarded as undesirable, and the addition of free lime to cement compositions is avoided. Free lime does not serve as an expansion additive because it is very rapidly hydrated and therefore expands far too early in the setting process to be effective. It is also known (see for example U.S. Pat. No. 3,106,453 and German Pat. No. 1,216,753) to subject free lime to certain specific treatments with water and/or $CO_2$ to produce a lime which hydrates at a slower rate, but the products obtained are ineffective as expansion additives. Likewise the products obtained by exposing lime to the atmosphere, which products contain $Ca(OH)_2$ and $CaCO_3$, are ineffective as expansion additives. It has also been proposed in U.S. Pat. No. 1,732,409 to make quick-setting lime products which contain a high proportion of lime, at least some of the lime being in the form of a product obtained by heating finely divided lime in an atmosphere containing $CO_2$ at a temperature of 500° to 850° C. until the increase in weight is 3 to 40% based on the weight of the starting material.

SUMMARY OF THE INVENTION

We have now discovered that excellent expansion additives for cement compositions can be made by heating particles comprising CaO in the presence of water vapor and/or $CO_2$, or simply by heating particles comprising CaO and a sufficient amount of calcium hydroxide which has been formed by absorption of water vapor.

In one aspect, the invention provides a pulverulent composition which is useful as an expansion additive for hydratable cement compositions; which consists essentially of particles (a) having a size less than 250 microns and (b) comprising a core of calcium oxide and a protective coating around said core of calcium hydroxide or calcium carbonate or both; which contains 36 to 95% by weight of calcium oxide; and which exhibits an Expansion Factor (as hereinafter defined) of at least 0.06%. Such compositions can be made by a process which comprises heating particles (a) having a size less than 250 microns and (b) comprising at least 36% by weight of CaO, with the remainder (if any) preferably consisting essentially of $Ca(OH)_2$ and/or $CaCO_3$, the particles being maintained at a temperature of at least 100° C. and, if the particles initially contain less than 8% by weight of $Ca(OH)_2$, the particles being maintained at a temperature of 100° to 400° C. in an atmosphere which comprises water vapor or at a temperature of 350° to 850° C. in an atmosphere which comprises carbon dioxide, said heating being carried out under conditions such that the product contains 36 to 95% by weight of CaO and exhibits an Expansion Factor (as hereinafter defined) of at least 0.06%.

The invention also includes the use of such lime-containing compositions as expansion additives in hydratable cement compositions, in particular cement compositions comprising a Portland cement, water and a lime-containing composition as defined above in amount less than 30%, based on the combined weight of the cement and the lime-containing composition. The invention further includes a method of making a shaped article which comprises casting a cement composition as defined above.

DETAILED DESCRIPTION OF THE INVENTION

Except where otherwise noted, parts and percentages in this specification are by weight. The Expansion Factor of a lime-containing composition is defined herein as the % increase in length of a test prism (test bar) which has been cured in water for 7 days after casting, according to ASTM C490-70 and C157-69T, from a mortar prepared according to ASTM C305-65 and containing 0.1 part of the lime-containing composition, 0.9 part of Type III Portland cement, 2 parts of No. 20 washed sand, and 0.4 part of water. The Expansion Factor of the treated limes of the invention is at least 0.06%, generally 0.07 to 2.5%, preferably 0.07 to 0.4%. The Expansion Factor is a measure of the effectiveness of the protective coating in delaying access of water to the calcium oxide core, and inter alia also of the calcium oxide content of the composition.

The larger is the particle size of the treated lime, the greater is its lime content for a given thickness of the protective coating. For this reason the particle size is generally at least 1 micron. On the other hand, if particles of size greater than 250 microns are used, they cause an undesirable reduction in strength. Larger particle sizes also make it more difficult to obtain a uniform distribution of the treated lime in a cement composition. The treated limes preferably have a particle size of 1 to 100 microns, especially 5 to 60 microns.

The starting materials used in this invention comprise at least 36% of CaO, with the remainder preferably consisting essentially of $Ca(OH)_2$ and/or $CaCO_3$. The term "consisting essentially of" is used to indicate that the starting material may contain minor amounts, generally less than 10%, of other ingredients which do not prevent formation of an effective protective coating, e.g. impurities such as silicates and oxides of iron, magnesium and aluminum. When the treated lime is prepared by heating the starting material in the presence of water vapor and/or carbon dioxide, the starting material preferably contains at least 80%, especially at least 90%, of CaO. Thus dolomitic limes, which contain lesser quantities of CaO, are not preferred starting materials.

When the atmosphere comprises water vapor, but no carbon dioxide, the temperature should be 100° to 400° C., preferably 150° to 400° C., especially 150° to 250° C. For a given residual CaO content, the higher the temperature of the treatment, the higher the expansion activity of the product. At temperatures below 100° C., the lime becomes hydrated but no effective protective coating is formed. At temperatures above 400° C., calcium hydroxide is not formed, or if present initially is at least partially decomposed. To ensure an adequate protective coating, heating in an atmosphere comprising water vapor should preferably be continued for a time such that the particles increase in weight by at least 2%, e.g. 2 to 16%, particularly 4 to 12%, especially 5 to 11%, based on the weight of the starting material. For a starting material which consists essentially of CaO, these weight increases will result in a product which contains at most 92%, e.g. 92 to 36%, particularly 84 to 50%, especially 84 to 50% of residual active lime as the core and a protective coating which consists essentially of calcium hydroxide.

When the atmosphere comprises carbon dioxide, a temperature of 350° to 850° C. is needed in order to convert the CaO to $CaCO_3$. At temperatures below 350° C. the reaction between CaO and $CO_2$ is very slow, and no effective protective coating is formed. At temperatures above 850° C. $CaCO_3$ is not formed or if present initially is decomposed. To ensure an adequate protective coating, heating in an atmosphere comprising $CO_2$ should preferably be continued for a time such that the particles increase in weight by at least 2%, e.g. 2 to 28%, particularly 4 to 16%, especially 5 to 16%, based on the weight of the starting material. For a starting material which consists essentially of CaO, these weight increases will result in a product which contains at most 95%, e.g. 36 to 95%, particularly 64 to 91%, especially 64 to 89%, of residual active lime as the core and a protective coating which consists essentially of calcium carbonate.

It is also possible to form a protective coating comprising both $CaCO_3$ and $Ca(OH)_2$ by heating the starting material in an atmosphere comprising $CO_2$ and water, preferably at a temperature of 350° to 400° C. Under such conditions, the heating should preferably be continued for a time such that the particles increase in weight by 4 to 14%, especially 5 to 12%, these weight increases corresponding to (for a starting material which consists essentially of CaO) final products containing 91 to 40%, especially 80 to 50% of residual active lime.

As noted above, limes which have been partially hydrated and/or carbonated at temperatures below 100° C. do not have an effective protective coating thereon and are not useful as expansion additives. Useful expansion additives can be obtained from such partially hydrated and/or carbonated limes by using them as starting materials in the processes described above which involves heating in an atmosphere comprising water vapor and/or $CO_2$, provided that the product has an adequate residual calcium oxide content. However, we have discovered that partially hydrated limes can also be converted into useful expansion additives by heating them at temperatures of at least 100° C., preferably less than 500° C., e.g. 200° to 400° C., in an atmosphere which contains no water vapor or carbon dioxide; in this embodiment of the invention, the starting material can comprise 8 to 64%, preferably 16 to 50%, of $Ca(OH)_2$, with the balance preferably consisting essentially of CaO. For a given CaO content, the higher is the temperature of the treatment and the longer its duration, the greater is the expansion activity of the product.

Treated limes which already have some expansion activity can be further treated by one of the processes described above to make them more active. However, it should be noted that such further treatment, especially when carried out in an atmosphere comprising water vapor at relatively low temperatures, e.g. below 200° C., especially below 150° C., can reduce the residual CaO content of the treated lime to an extent such that activity is reduced.

The heat treatments described above can be carried out in any convenient way which does not involve grinding of the particles which would disrupt the protective coating. For small quantities of product, the starting material can simply be spread out on a pan. For larger quantities fluidised bed procedures may be used.

The novel expansion additives can be incorporated into hydratable cement compositions in any convenient way, but we have found that optimum expansion activity is obtained if the additive is added to a mixture of at least part of the cement and at least part of the water. The cement compositions can of course contain sand, aggregate and other conventional additives, but the presence of additional quicklime, hydrated lime or carbonated lime is preferably avoided. The novel additives exhibit a delayed reactivity with water, measured by ASTM Test C110-71, Section 9, of up to 100 minutes, but this does not account for the fact that in cement compositions they show a much greater delayed reactivity. It is thought that this unexpectedly delayed reactivity is due to some form of interaction between the protective coating and components present in the cement slurry. The amount of the additive used will depend inter alia on its CaO content and the strength and expansion desired in the final product, and will generally be 3 to 30%, preferably 3 to 10%, especially 5 to 7%, based on the combined weight of the hydratable cement and the additive. Especially when the treated limes have been thoroughly treated, their presence has little or no deleterious effect on such important properties of the cement composition as water requirements, consistency, open time, and tendency to "false set".

The invention is illustrated in the following Examples. The expansion activities of the various samples prepared in Examples 1–7 are shown in Table 1, which shows the % increase in length of test prisms (i.e. test bars) which (except where otherwise noted) were cured in water after casting according to ASTM C490-70 and C157-69T from mortars prepared according to ASTM C305-65 and containing 1 part of a mixture of the treated lime sample and a Type III Portland cement (Norcem Rapid), 2 parts of No. 20 washed Monterey sand, and 0.4 parts of water. The amount of the treated lime sample in the test prism and the number of days of curing are given in parentheses after each % expansion figure. The samples with a "C" after the sample number in Table 1 are comparative examples, not in accordance with the invention.

EXAMPLE 1

Portions of $CaCO_3$ having a particle size less than 44 microns were heated in a muffle oven at 1000° C. for the time necessary to produce samples comprising CaO in amount 100% (Sample 1), 93.6% (Sample 2), 90.2% (Sample or 72.3% (Sample 4). Portions of Sample 1 were heated in a muffle oven at 580° C. in an atmosphere of $CO_2$ until the CaO content was 94.5% (Sample 5), 89.8% (Sample 6) and 80.5% (Sample 7). Portions of a commercially available lime (Flintkote) having a particle size less than 44 microns were heated in a muffle oven at 580° C. in an atmosphere of $CO_2$ until the CaO content was 94.8% (Sample 8), 87.5% (Sample 9) or 74.8% (Sample 10).

EXAMPLE 2

Portions of a commercially available lime (Flintkote) containing about 95% CaO, with the remainder $Ca(OH)_2$ and a trace of $CaCO_3$, and having a particle size less than 44 microns, were exposed to water vapor at 22° C. (Sample 11), 60° C. (Sample 12), 100° C. (Sample 13), 150° C. (Sample 14) or 200° C. (Sample 15) until the CaO content had been reduced to the level shown in Table 1.

EXAMPLE 3

A treated lime having expansion activity, containing 60% CaO, 27% $Ca(OH)_2$ and 13% $CaCO_3$, and having a particle size less than 100 microns (Sample 16) was exposed to water vapor at 22° C. (Sample 17), 60° C. (Sample 18), 100° C. (Sample 19), 150° C. (Sample 20) and 200° C. (Sample 21) until the CaO content was 31% (Sample 17) or 40% (Samples 18–21).

EXAMPLE 4

A treated lime having expansion activity, containing 85% CaO, 5% $Ca(OH)_2$ and 10% $CaCO_3$, and having a particle size less than 100 microns, was exposed to water vapor at 110° C. until the CaO content had been reduced to 64% (Sample 22). Portions of Sample 22 were heated at 110° C. for 180 min. (Sample 23), at 200° C. for 15 min. (Sample 24), at 200° C. for 60 min. (Sample 25), at 300° C. for 15 min. (Sample 26), at 340° C. for 30 min. (Sample 27), at 340° C. for 50 min. (Sample 28), at 400° C. for 90 min. (sample 29) and at 455° C. for 15 min. (Sample 30). Samples 29 and 30 lost 2% and 3% in weight, respectively, during the heat treatment, due to decomposition of calcium hydroxide. The same treated lime was exposed to water vapor at 200° C. until the CaO content had been reduced to 64% (Sample 31). A commercially available lime (Diamond Springs) consisting essentially of CaO and having a particle size less than 100 microns was exposed to water vapor at 25° C. until the CaO content was 64% (Sample 32). A portion of Sample 32 was heated at 340° C. for 60 minutes (Sample 33). Another sample of the same commercially available lime was exposed to water vapor at 200° C. until the CaO content had been reduced to 58% (Sample 34).

EXAMPLE 5

Portions of a commercially available lime (Flintkote) as used in Example 2 were exposed to water vapor at 260° C. until the CaO content was 85% (Sample 35) or 58% (Sample 36). These Samples were made into mortars as described above except that a Type 1-2 cement (Kaiser Permanente) was used and the amount of water was 0.36 part. A Control mortar containing no added lime was also prepared. The prisms cast from these mortars were cured both in water and in 50% relative humidity air.

EXAMPLE 6

A treated lime having expansion activity, containing 84.5% CaO, 6.2% $Ca(OH)_2$ and 9.3% $CaCO_3$, and having a particle size less than 100 microns was used to prepare mortars containing 0.9 part of a Type 1-2 cement (Kaiser Permanente), 0.1 part of the treated lime, 2 parts of No. 20 washed Monterey sand and 0.36 part of water. The mortars were prepared by three different methods.

Method 1 (ASTM C305-65)

A. The treated lime and cement were dry mixed. B. The water was added and mixed at slow speed for 30 seconds. C. The sand was added and slow speed mixing continued for another 30 seconds. D. The mixer was increased to medium speed for 30 seconds. E. Pause for 90 seconds. F. Mix at medium speed for 1 min.

Method 2

A. Mix the cement and water for 30 seconds. B. Add the treated lime and mix for 30 seconds. C–F. Same as in Method 1.

Method 3

A. The treated lime and water were mixed for 30 seconds, then the cement was added and mixed for 30 seconds. D–F. Same as in Method 1.

The % expansions of prisms cast from these mortars are shown in Table 1 under Samples 37, 38 and 39 (Methods 1, 2 and 3 respectively).

EXAMPLE 7

A commercially available lime (Flintkote) was fractionated into a first fraction in which the particles were 45 to 425 microns in size and a second fraction in which the particles were less than 45 microns in size. Both fractions were heated at 950° C. for 1 hour and then treated with water vapor at 200° C. until the CaO content was 69.5% (first fraction, Sample 40) or 73% (second fraction, Sample 41).

TABLE 1

| Ex. No. | Sample No. | % CaO | | % Expansion (parts of sample in mortar, days) |
| --- | --- | --- | --- | --- |
| 1 | 1(C) | 100 | 0.042 | (0.1, 7) |
|  | 2(C) | 93.6 | 0.031 | " |
|  | 3(C) | 90.2 | 0.031 | " |
|  | 4(C) | 72.3 | 0.029 | " |
|  | 5 | 94.5 | 0.234 | " |
|  | 6 | 89.8 | 0.188 | " |
|  | 7 | 80.5 | 2.3 | " |
|  | 8 | 94.8 | 0.077 | " |
|  | 9 | 87.5 | 0.150 | " |
|  | 10 | 74.8 | 0.757 | " |
| 2 | 11(C) | 49 | 0.037 | " |
|  | 12(C) | 53 | 0.043 | " |
|  | 13 | 53 | 0.125 | " |
|  | 14 | 57 | 0.212 | " |

TABLE 1-continued

| Ex. No. | Sample No. | % CaO | % Expansion (parts of sample in mortar, days) | | | | | | |
|---|---|---|---|---|---|---|---|---|---|
| | 15 | 53 | 0.347 | " | | | | | |
| 3 | 16 | 60 | 0.61 | (0.1, 14) | 0.067 | (0.04, 16) | | | |
| | 17(C) | 31 | 0.134 | " | 0.046 | " | | | |
| | 18 | 40 | 0.186 | " | 0.045 | " | | | |
| | 19 | 40 | 0.330 | " | 0.044 | " | | | |
| | 20 | 40 | 0.413 | " | 0.058 | " | | | |
| | 21 | 40 | 2.8 | " | 0.092 | " | | | |
| 4 | 22 | 64 | 0.077 | (.08, 1) | 0.147 | (.08, 7) | 0.156 | (.08, 14) | |
| | 23 | 64 | 0.068 | " | 0.131 | " | 0.138 | " | |
| | 24 | 64 | 0.065 | " | 0.104 | " | 0.110 | " | |
| | 25 | 64 | 0.211 | " | 0.332 | " | — | " | |
| | 26 | 64 | 0.063 | " | 0.212 | " | 0.218 | " | |
| | 27 | 64 | 0.025 | " | 0.556 | " | 0.560 | " | |
| | 28 | 64 | 0.020 | " | 0.651 | " | 0.656 | " | |
| | 29 | 72 | 0.043 | " | 0.394 | " | 0.401 | " | |
| | 30 | 76 | 0.084 | " | 0.358 | " | 0.363 | " | |
| | 31 | 64 | 0.020 | " | 0.619 | " | 0.625 | " | |
| | 32(C) | 64 | 0.019 | " | 0.022 | " | 0.022 | " | |
| | 33 | 64 | 0.176 | " | 0.632 | " | 0.635 | " | |
| | 34 | 58 | 0.155 | " | 0.347 | " | 0.352 | " | |
| 5 | 35 | 83 | 0.10 | (.07, 1) | 0.21 | (.07, 7) | 0.23 | (.07, 40) | |
| | 36 | 58 | 0.02 | " | 0.20 | " | 0.22 | " | |
| | Control | | 0.01 | (0, 1) | 0.015 | (0, 7) | 0.02 | (0, 40) | |
| | 35 | 83 | −0.01 | (.07, 1) | 0 | (.07, 7) | 0.47 | (.07, 40) | cured at 50% R.H. |
| | 36 | 58 | −0.01 | " | −0.02 | " | −0.025 | " | |
| | Control | | −0.01 | (0, 1) | −0.035 | (0, 7) | −0.055 | (0, 40) | |
| 6 | 37 | 84.5 | 0.331 | (.1, 11) | | | | | |
| | 38 | 84.5 | 0.409 | " | | | | | |
| | 39 | 84.5 | 0.246 | " | | | | | |
| 7 | 40 | 69.5 | 0.09 | (.06, 2) | 0.15 | (.06, 3) | 0.165 | (.06, 10) | 0.18 (.06, 13) |
| | 41 | 73 | 0.03 | " | 0.04 | " | 0.10 | " | 0.12 " |
| | 40 | 69.5 | 0.20 | (.1, 2) | 1.16 | (.1, 5) | 1.21 | (.1, 6) | 1.24 (.1, 18) |
| | 41 | 73 | 0.05 | " | 0.60 | " | 0.72 | " | 0.75 " |

EXAMPLE 8

A commercially available lime (Cementa) was treated with water vapor at 250° C. until the CaO content was 80%, and was then fractionated into a first fraction in which the particles were less than 74 microns in size and a second fraction in which the particles were 75 to 125 microns in size. The first fraction was used to prepare mortars containing 0.954 part of a Type 1 cement (Norcem PC 300), 0.046 part of the treated lime, 3 parts of No. 20 washed Monterey sand, and 0.5 part of water. The second fraction was used to prepare mortars in the same way except that 0.96 part of the cement and 0.04 part of the treated lime were used. The compressive strength of prisms cast from these mortars was measured after curing in water for the indicated number of days, and is shown in Table 2.

Table 2

| Particle Size | Compressive Strength (kg/cm$^2$) after | | |
|---|---|---|---|
| | 1 day | 3 days | 7 days |
| 0–74 | 105.5 | 240 | 300 |
| 75–125 | 103.5 | 195 | 248 |

EXAMPLE 9

Portions of a commercially available lime (Flintkote) as used in Example 2 were treated with water vapor at 200° C. until the CaO content was 91% (Sample 42), 70% (Sample 43) or 49.5% (Sample 44) or with CO$_2$ at 580° C. until the CaO content was 88% (Sample 45) or 68% (Sample 46). Part of Sample 45 was treated with water vapor at 200° C. until the CaO content was 54% (Sample 47). Cement pastes were made by dry mixing 0.1 part of the sample and 0.9 part of a Type 1-2 cement (Kaiser Permanente); water (0.36 part) was then added and the mixture was mixed in a Hobart Mixer for 20 seconds at low speed followed by 20 seconds at medium speed. The pastes were placed in a Halliburton Consistometer, and their consistencies, expressed in Halliburton Consistency units, are shown in Table 3 below (which also shows results for a paste containing 1 part of the Type 1-2 cement and no treated lime).

Table 3

| Sample No. | Consistency after indicated time (mins.) | | | | | | | | | | | | |
|---|---|---|---|---|---|---|---|---|---|---|---|---|---|
| | 0 | 20 | 40 | 60 | 80 | 100 | 120 | 140 | 160 | 180 | 200 | 220 | 240 |
| 42 | x100 | 45 | 45 | 47 | 49 | 53 | 64 | 82 | 100 | | | | |
| 43 | 40 | 40 | 38 | 38 | 40 | 42 | 43 | 45 | 48 | 52 | 58 | 63 | 70 |
| 44 | 32 | 33 | 32 | 34 | 36 | 38 | 40 | 42 | 45 | 50 | 56 | 63 | 75 |
| 45 | x100 | 42 | 40 | 42 | 42 | 43 | 47 | 52 | 58 | 63 | 70 | 79 | 91 |
| 46 | 56 | 50 | 47 | 45 | 45 | 46 | 46 | 50 | 51 | 53 | 56 | 60 | 67 |
| 47 | 55 | 38 | 36 | 36 | 36 | 36 | 38 | 40 | 41 | 43 | 45 | 48 | 54 |
| Control | 52 | 38 | 36 | 36 | 36 | 36 | 36 | 37 | 38 | 39 | 40 | 42 | 43 | x shows "false set"

We claim:

1. A pulverulent composition which is useful as an expansion additive for hydratable cement compositions; which consists essentially of particles having a size less than 100 microns and comprising a core of calcium oxide and a protective coating around said core of calcium carbonate; which contains 36 to 95% by weight of calcium oxide; and which exhibits an Expansion Factor of at least 0.06%.

2. A composition according to claim 1 which comprises 40 to 91% by weight of calcium oxide and wherein said protective coating consists essentially of calcium carbonate.

3. A composition according to claim 2 which comprises 64 to 91% by weight of calcium oxide.

4. A composition according to claim 1 wherein said particles have a size of 1 to 100 microns.

5. A composition according to claim 4 wherein said particles have a size of 5 to 60 microns.

6. A composition according to claim 1 having an Expansion Factor of 0.07 to 0.4%.

7. A process for the production of a composition useful as an expansion additive for hydratable cement compositions, which process comprises heating particles (a) having a size less than 100 microns and (b) initially comprising at least 80% by weight of CaO at a temperature of 100 to 400° C. in an atmosphere comprising water vapor for a time sufficient to increase the weight of the particles by at least 2%, said heating being carried out under conditions such that the product contains 36 to 95% by weight of CaO and exhibits an Expansion Factor of at least 0.06%.

8. A process according to claim 7 wherein the weight of the particles is increased by 4 to 12%.

9. A process according to claim 8 wherein the weight of the particles is increased by 5 to 11%.

10. A process for the production of a composition useful as an expansive additive for hydratable cement compositions, which process comprises heating particles (a) having a size less than 100 microns and (b) initially comprising at least 80% by weight of CaO at a temperature of 350° to 850° C. in an atmosphere comprising $CO_2$ for a time sufficient to increase the weight of the particles by at least 2%, said heating being carried out under conditions such that the product contains 36 to 95% by weight of CaO and exhibits an Expansion Factor of at least 0.06%.

11. A process according to claim 10 wherein the weight of the particles is increased by 4 to 16%.

12. A process for the production of a composition useful as an expansion additive for hydratable cement compositions, which process comprises heating particles (a) having a size less than 100 microns and (b) initially comprising at least 80% by weight of CaO, the particles being maintained at a temperature of at least 100° C. in an atmosphere which comrpises $CO_2$ and water vapor for a time sufficient to increase the weight of the particles by 4 to 14%, said heating being carried out under conditions such that the product contains 36 to 95% by weight of CaO and exhibits an Expansion Factor of at least 0.06%.

13. A process for the production of a composition useful as an expansion additive for hydratable cement compositions, which process comprises heating hydrated lime particles at a temperature of 100° to 400° C., said particles (a) having a size less than 100 microns and (b) comprising at least 36% by weight of CaO and 8 to 64% by weight of $Ca(OH)_2$, said heating being carried out under conditions such that the product contains 36 to 95% by weight of CaO and exhibits an Expansion Factor of at least 0.06%.

14. A process according to claim 13 wherein said particles initially contain 16 to 50% by weight of $Ca(OH)_2$.

15. A cement composition comprising a Portland cement, water and a pulverulent composition which consists essentially of particles having a size less than 100 microns and comprising a core of calcium oxide and a protective coating around said core of calcium carbonate; which contains 36 to 95% by weight of calcium oxide; and which exhibits an Expansion Factor of at least 0.06%; said pulverulent composition being present in amount less than 30%, based on the combined weight of the cement and the pulverulent composition.

16. A cement composition according to claim 15 which comprises 3 to 10% of said pulverulent composition, based on the combined weight of the cement and the pulverulent composition.

17. A cement composition according to claim 15 wherein said pulverulent composition comprises 40 to 91% by weight of calcium oxide and said protective coating consists essentially of calcium carbonate.

18. A cement composition according to claim 17 wherein said pulverulent composition comprises 64 to 91% by weight of calcium oxide.

19. A cement composition according to claim 15 wherein said particles have a size of 1 to 100 microns.

20. A cement composition according to claim 19 wherein said particles have a size of 5 to 60 microns.

21. A composition according to claim 15 wherein said pulverulent composition has an Expansion Factor of 0.07 to 0.4%.

22. A process for the production of a cement composition comprising a Portland cement, water and a pulverulent composition which consists essentially of particles having a size less than 100 microns and comprising a core of calcium oxide and a protective coating around said core of calcium carbonate; which contains 36 to 95% by weight of calcium oxide; and which exhibits an Expansion Factor of at least 0.06%; said pulverulent composition being present in amount less than 30%, based on the combined weight of the cement and the pulverulent composition; which process comprises
(a) mixing together at least part of the Portland cement and at least part of the water; and
(b) adding the pulverulent composition to the mixture produced in step (a).

23. A pulverulent composition which is useful as an expansion additive for hydratable cement compositions; which consists essentially of particles having a size less than 100 microns and comprising a core of calcium oxide and a protective coating around said core of calcium hydroxide; which exhibits an Expansion Factor of at least 0.06%.

24. A pulverulent composition which is useful as an expansion additive for hydratable cement compositions; which consists essentially of particles having a size less than 100 microns and comprising a core of calcium oxide and a protective coating around said core of calcium hydroxide and calcium carbonate; which exhibits an Expansion Factor of at least 0.06%.

25. A cement composition comprising a Portland cement, water and a pulverulent composition which consists essentially of particles having a size less than 100 microns and comprising a core of calcium oxide and a protective coating around said core of calcium hydroxide; which contains 36 to 95% by weight of calcium oxide; and which exhibits an Expansion Factor of at least 0.06%; said pulverulent composition being present in amount less than 30%, based on the combined weight of the cement and the pulverulent composition.

26. A cement composition comprising a Portland cement, water and a pulverulent composition which consists essentially of particles having a size less than 100 microns and comprising a core of calcium oxide and a protective coating around said core of calcium hydroxide and calcium carbonate; which contains 36 to 95% by weight of calcium oxide; and which exhibits an Expansion Factor of at least 0.06%; said pulverulent composition being present in amount less than 30%, based on the combined weight of the cement and the pulverulent composition.

27. A process for the production of a cement composition comprising a Portland cement, water and a pulverulent composition which consists essentially of particles having a size less than 100 microns and comprising a core of calcium oxide and a protective coating around said core of calcium hydroxide; which contains 36 to 95% by weight of calcium oxide; and which exhibits an Expansion Factor of at least 0.06%; said pulverulent composition being present in amount less than 30%, based on the combined weight of the cement and the pulverulent composition; which process comprises
 (a) mixing together at least part of the Portland cement and at least part of the water; and
 (b) adding the pulverulent composition to the mixture produced in step (a).

28. A process for the production of a cement composition comprising a Portland cement, water and a pulverulent composition which consists essentially of particles having a size less than 100 microns and comprising a core of calcium oxide and a protective coating around said core of calcium hydroxide and calcium carbonate; which contains 36 to 95% by weight of calcium oxide; and which exhibits an Expansion Factor of at least 0.06%; said pulverulent composition being present in amount less than 30%, based on the combined weight of the cement and the pulverulent composition; which process comprises
 (a) mixing together at least part of the Portland cement and at least part of the water; and
 (b) adding the pulverulent composition to the mixture produced in step (a).

29. A composition according to claim 23 which comprises 36 to 92% by weight of calcium oxide and wherein said protective coating consists essentially of calcium hydroxide.

30. A composition according to claim 29 which comprises 50 to 84% by weight of calcium oxide.

31. A composition according to claim 23 or 24 wherein said particles have a size of 1 to 100 microns.

32. A composition according to claim 31 wherein said particles have a size of 5 to 60 microns.

33. A composition according to claim 23 or 24 having an Expansion Factor of 0.07 to 0.4%.

34. A cement composition according to claim 25 or 26 which comprises 3 to 10% of said pulverulent composition, based on the combined weight of the cement and the pulverulent composition.

35. A cement composition according to claim 25 or 26 wherein said pulverulent composition comprises 36 to 92% by weight of calcium oxide and said protective coating consists essentially of calcium hydroxide.

36. A cement composition according to claim 35 wherein said pulverulent composition comprises 50 to 84% by weight of calcium oxide.

37. A cement composition according to claim 25 or 26 wherein said particles have a size of 1 to 100 microns.

38. A cement composition according to claim 37 wherein said particles have a size of 5 to 60 microns.

39. A composition according to claim 25 or 26 wherein said pulverulent composition has an Expansion Factor of 0.07 to 0.04%.

* * * * *